United States Patent Office 3,743,640
Patented July 3, 1973

3,743,640
NOVEL DYES CONTAINING A SUBSTITUTED
2-PYRAZOLIN-5-ONE NUCLEUS
Frank G. Webster, Rochester, N.Y., assignor to Eastman Kodak Company, Rochester, N.Y.
No Drawing. Original appplication Sept. 8, 1967, Ser. No. 666,512, now Patent No. 3,579,344, dated May 18, 1971. Divided and this application June 22, 1970, Ser. No. 59,818
Int. Cl. C09b 23/10
U.S. Cl. 260—240.2
8 Claims

ABSTRACT OF THE DISCLOSURE

Novel merocyanine and oxonol dyes are provided which feature a 3-arylamino or a 3-lower fatty acid amido substituted 2-pyrazolin-5-one nucleus. Merocyanine dye salts of the invention sensitize direct positive photographic silver halide emulsions.

---

This application is a division of my copending application Ser. No. 666,512, filed Sept. 8, 1967, now U.S. Patent 3,579,344.

This invention relates to novel photographic materials, and more particularly to a new class of merocyanine and oxonol dyes, to direct positive silver halide emulsions containing certain of these new dyes, and to photographic elements prepared with such emulsions.

In one important aspect, this invention is directed to the provision of novel dyes which function as effective electron acceptors in direct positive emulsions. The class of dyes of this invention would not be expected to function as sensitizers in direct positive emulsions, since the closely related dyes of British Pat. 544,645 are sensitizers for negative emulsions. Such prior art dyes do not function as efficient electron acceptors in direct positive emulsions. This class of dyes is especially useful, since they provide good sensitization to shorter wavelength radiation, particularly to blue and, in some cases, to green radiation. The dyes of the invention are particularly effective in reduction and gold fogged emulsions of the type described in British Pat. 723,019.

It is, accordingly, an object of this invention to provide a new class of improved and novel, direct positive photographic silver halide emulsions, and more particularly fogged emulsions of this type, containing at least one of the novel dyes of the invention. Another object of this invention is to provide novel emulsions as above containing, in addition, a photographic color former. Another object of this invention is to provide novel light-sensitive photographic elements comprising a support material having thereon at least one layer of the novel emulsions of the invention. Another object of this invention is to provide novel merocyanine and oxonol dyes. Still another object of this invention is to provide novel filter dyes. Other objects of this invention will be apparent from this disclosure and the appended claims.

I have now found that certain merocyanine quaternary salt dyes containing a 3-arylamino, or 3-lower fatty acid amido substituted 2-pyrazolin-5-one nucleus are outstanding electron acceptors, and in some instances are spectral sensitizers, in direct positive type photographic silver halide emulsions. They provide superior reversal systems, especially with fogged direct positive silver halide emulsions that are characterized by both good speed and desired selective sensitivity to radiation in the blue or green region of the spectrum with maximum sensitivity occurring in the region of less than 525 nm. The images produced with these new direct positive photographic emulsions are clear and sharp, and of excellent contrast. The corresponding unquaternized merocyanine and certain oxonol dyes of the invention, I have further found, function primarily as useful filter dyes in photographic filter layers.

The novel merocyanine and oxonol dyes of the invention comprise first and second 5- to 6-membered nitrogen containing heterocyclic nuclei joined by a linkage such as a double bond or a methine bridge, at least one of said nuclei being a 3-arylamino or a 3-lower fatty acid amido substituted 2-pyrazolin-5-one nucleus joined at the 4-carbon atom thereof to said linkage; and said second nucleus being joined at a carbon atom thereof to said linkage to complete said dye.

The preferred merocyanine quaternary salt dyes of the invention that are especially useful as electron acceptors and sensitizers for direct positive photographic silver halide emulsions are represented by the following general formula:

(I.) 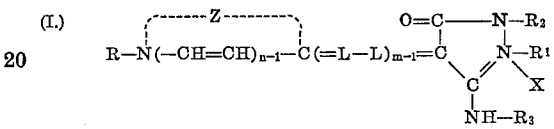

wherein $n$ and $m$ each represents a positive integer of from 1 to 2; L represents a methine linkage, e.g., —CH—, —C(CH$_3$)=, —C(C$_6$H$_5$)=, etc.; R$_1$ represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group. e.g., β-methoxycarbonylethyl, ω-ethoxycarbonylbutyl, etc., or an aralkyl group, e.g., benzyl, phenethyl, etc., and the like; an alkenyl group, e.g., allyl, 1-propenyl, 2-butenyl, etc., and the like; R represents a group given for R$_1$, or any aryl group, e.g., phenyl, tolyl, naphthyl, methoxyphenyl, chlorophenyl, etc.; R$_2$ represents an alkyl group e.g., methyl and ethyl or an aryl group, e.g., phenyl, tolyl, xylyl, naphthyl, methoxyphenyl, cyanophenyl, nitrophenyl, chlorophenyl, 2,5-dichlorophenyl, 2,4,6-trichlorophenyl, etc.; R$_3$ represents an aryl group, e.g., phenyl, tolyl, xylyl, naphthyl, methoxyphenyl, cyanophenyl, nitrophenyl, chlorophenyl, 2,5-dichlorophenyl, 2,4,6-trichlorophenyl, p-fluorosulfonylphenyl, etc., or an acyl group, e.g. —COR$_4$ wherein R$_4$ is an alkyl group containing from 1 to 4 carbon atoms, e.g., methyl, ethyl, propyl, isopropyl, butyl, etc. (which substituents form a 3-lower fatty acid amido substituted 2-pyrazolin-5-one nucleus); X represents an acid anion, e.g., chloride, bromide, iodide, thiocyanate, sulfamate, perchlorate, p-toluenesulfonate, methyl sulfate, ethyl sulfate, etc.; and Z represents the nonmetallic atoms necessary to complete a sensitizing or a desensitizing heterocyclic nucleus containing from 5 to 6 atoms in the heterocyclic ring, which nucleus may contain a second hetero atom such as oxygen, sulfur, selenium or nitrogen, such as the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 4- or 5-nitrobenzothiazole, 5-chlorobenzothiazole, 6 - chlorobenzothiazole, 7 - chlorobenzothiazole, 4-methylbenzothiazole, 5-methylbenzothiazole, 6-methylbenzothiazole, 6-nitrobenzothiazole, 5-bromobenzothiazole, 6-bromobenzothiazole, 5-chloro-6- nitrobenzothiazole, 4 - phenylbenzothiazole, 4 - methoxybenzothiazole, 5-methoxybenzothiazole, 6-methoxybenzothiazole, 5 - iodobenzothiazole, 6 - iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, α-naphthothiazole, β-naphthothiazole, β,β - naphthothiazole, 5 - methoxy-β,β-naphthothiazole, 5-ethoxy-β-naphthothiazole, 8-methoxy-α-naphthothiazole, 7-methoxy-α-naphthothiazole, 4′-methoxythianaphtheno - 7′,6′,4,5 - thiazole, nitro group substituted naphthothiazoles, etc.; an oxazole nucleus, e.g., 4-methyloxazole, 4 - nitro-oxazole, 5 - methyloxazole, 4 - phenyloxazole, 4,5-diphenyloxazole, 4-ethyloxazole, 4,5-dimethoxazole, 5-phenyloxazole, benzoxazole, 5-chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6 - dimethylbenzoxazole, 4,6 - dimethylbenzoxazole, 5 - methoxybenzoxazole, 5 - ethoxybenzoxazole, 5-chlorobenzoxazole, 6-methoxybenzoxazole, 5-hydroxybenzoxazole, 6-hydroxybenzoxazole, α-naphthoxazole, β-naphthoxazole, nitro group substituted naphthoxazoles, etc.; a selenazole nucleus, e.g., 4-methylselenazole, 4-nitroselenazole, 4-phenylselenazole, benzoselenazole, 5-chlorobenzoselenazole, 5-methoxybenzoselenazole, 5-hydroxybenzoselenazole, 5- or 6-nitrobenzoselenazole, 5-chloro - 6 - nitrobenzoselenazole, tetrahydrobenzoselenazole,, α-naphthoselenazole, β-naphthoselenazole, nitro group substituted naphthoselenazoles, etc.; a thiazoline nucleus, e.g., thiazoline, 4-methylthiazoline, 4-nitrothiazoline, etc.; a pyridine nucleus, e.g., 2-pyridine, 5-methyl-2-pyridine, 4-pyridine, 3-methyl-4-pyridine, nitro group substituted pyridines, etc.; a quinoline nucleus, e.g., 2-quinoline, 3-methyl-2-quinoline, 5-ethyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1-isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3-dimethyl-5 or 6-nitroindolenine, 3,3-dimethyl-5- or 6-cyanoindolenine, etc.; and, an imidazole nucleus e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1-alkyl-α-naphthimidazole, 1-aryl-β-naphthimidazole, 1-alkyl-5-methoxy-α-naphthimidazole, or, an imidazo[4,5-b]quinoxaline nucleus, e.g., 1,3 - dialkylimidazo[4,5-b]quinoxaline such as 1,3-diethylimidazo[4,5-b]quinoxaline, 6-chloro-1,3-diethylimidazo[4,5-b]quinoxaline, etc., 1,3-dialkenylimidazo[4,5-b]quinoxaline such as 1,3-diallylimidazo[4,5-b]quinoxaline, 6 - chloro-1,3-diallylimidazo[4,5-b]quinoxaline, etc., 1,3-diarylimidazo[4,5-b]quinoxaline such as 1,3-phenylimidazo[4,5-b]quinoxaline, 6- chloro - 1,3 - diphenylimidazo[4,5-b]quinoxaline, and the like. Nuclei wherein Z completes an imidazo[4,5-b]quinoxaline nucleus, or a nitro group substituted thiazole, oxazole, selenazole, thiazoline, pyridine, quinoline or imidazole nucleus are desensitizing nuclei. From the foregoing, it will be apparent that Z constitutes the atoms necessary to complete a heterocyclic nitrogen containing nucleus of the type used in the production of merocyanine and oxonol dyes. The dyes of Formula I wherein $R_3$ represents an aryl group have shown greater speed and are preferred.

The merocyanine dyes of the invention defined above are powerful electron acceptors and spectral sensitizers for direct positive photographic silver halide emulsions. In addition, they are also useful desensitizers in emulsions used in the process described in Stewart and Reeves, U.S. Patent No. 3,250,618, issued May 10, 1966.

As used herein "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 gram dye per mole of silver, cause by electron trapping at least about an 80 percent loss in the blue speed of the emulsion when sensitometrically exposed and developed three minutes in Kodak developer D–19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95% loss of speed to blue radiation).

The unquaternized merocyanine dyes and the oxonol dyes of the invention that are primarily useful as filter dyes in photographic layers and elements are represented by the following general formulas:

(II) 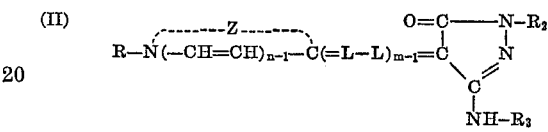

and (III) 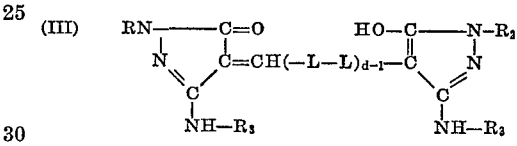

wherein $n$, $m$, R, $R_2$ $R_3$ and Z are as previously defined, and $d$ represents a positive integer of from 1 to 3.

The merocyanine dyes and quaternary salts thereof defined by Formulas I and II, wherein $m$ is 2, can be prepared in a number of ways. For example, they can be conveniently prepared by heating a mixture of (1) a heterocyclic compound of the formula:

(IV) 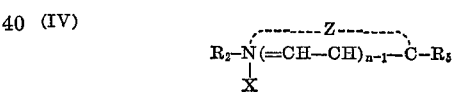

wherein $n$, $R_1$, X and Z are as previously defined, and $R_5$ represents methyl, ethyl, benzyl, etc., and (2) a 2-pyrazolin-5-one compound of the formula:

(V) 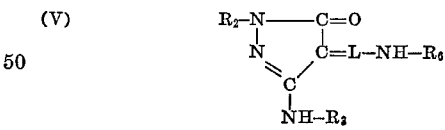

wherein $n$, R, X and Z are as previously defined, and $R_8$ represents an aryl group, e.g., phenyl, tolyl, etc., in approximately equimolar proportions, in the presence of a condensing agent such as a trialkylamine, e.g., triethylamine, etc., piperidine, N-methylpiperidine, etc., in an inert solvent medium such as acetic anhydride, etc. The crude dyes of Formula II above are then separated from the reaction mixtures and purified by one or more recrystallizations from appropriate solvents such as hot pyridine, etc. The purified dyes are next converted to the corresponding quaternary salts of Formula I above by heating with appropriate quaternizing reagents such as dimethylsulfate, methyl p-toluenesulfonate, etc., followed by cooling and one or more recrystallizations.

The dyes and salts of Formulas I and II above can also be prepared by reacting (1) a compound of the formula:

(VI) 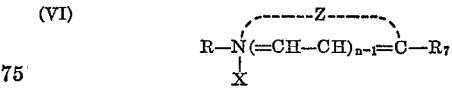

wherein n, R, X and Z are as previously defined, and R₇ represents acetanilidovinyl group w,hich (2) a compound of the formula:

(VII)

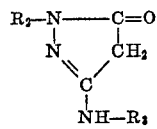

wherein R₂ and R₃ are as previously defined, followed by quaternization, under substantially similar reaction conditions as above described.

To prepare the dyes and salts defined by Formulas I and II above, wherein m is 1, a convenient method comprises heating a mixture of (1) a compound of the formula:

(VIII)

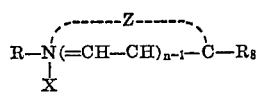

wherein n, R. X and Z are as previously defined, and R₈ represents an alkylthio group, e.g., methylthio, ethylthio, etc., or an arylthio group, e.g., phenylthio, etc.; and (2) a compound defined by Formula VII above, followed by quaternization, under substantially similar reaction conditions as above described.

The oxonol dyes of the invention defined by Formula III above are conveniently prepared by condensing approximately 2 moles of a compound of Formula VII above with one or more moles of, for example, diethoxymethyl acetate (forms monomethine oxonol dyes, i.e., those wherein d is 1), or 1,1,3-trimethoxypropene (forms trimethine oxonol dyes, i.e., those wherein d is 2), or glutaconic aldehyde dianil hydrochloride (forms pentathine oxonol dyes, i.e., those wherein d is 3), in the presence of a condensing agent such as tirethylamine, in an inert solvent medium such as ethanol, at refluxing temperatures of the reaction mixture. After the reaction is substantially completed, the crude dye compounds are separated, precipitated in water acidified with hydrochloric acid and purified by one or more recrystallizations from appropriate solvents such as methanol.

In accordance with this invention, I prepared my new class of improved and novel, direct positive photographic silver halide emulsions by incorporating one or more of the cyanine dyes of Formula I above of the invention into a sutable fogged silver halide emulsion. The emulsion can be fogged in any suitable manner, such as by light or with chemical fogging agents, e.g., stannous chloride, formaldehyde, thiourea dioxide and the like. The emulsion may be fogged by the addition thereto of a reducing agent such as thiourea dioxide and a compound of a metal more electropositive than silver such as a gold salt, for example, potassium chloroaurate as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride (NH₄)₂PdCl₆ and the like.

Useful concentrations of reducing agent and metal compound (e.g., metal salt) can be varied over a considerable range. As a general guideline, good results are obtained using about .05 to 40 mg. reducing agent per mole of silver halide, and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in Kodak Developer DK–50 having the composition set forth below, when the emulsion is coated at a silver coverage of 50 mg. to 500 mg. per square foot.

DEVELOPER

|  | G. |
| --- | --- |
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |

Water to make 1.0 l.

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways such as those described in Berriman U.S. patent application Ser. No. 448,467, filed Apr. 15, 1965, now U.S. Pat. 3,367,778 issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

|  | Grams |
| --- | --- |
| N-methyl-p-aminophenol sulfate | 2.5 |
| Ascorbic acid | 10.0 |
| Potassium metaborate | 35.0 |
| Potassium bromide | 1.0 |

Water to 1 liter.
pH of 9.6.

Before the shell of water-insoluble silver salt is added to the silver salt core, the core emulsions are first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Saubeneir in Science et Industries Photographiques, vol. XXVIII, January 1957, pages 1 to 23 and January 1957, pages 57 to 65 are particularly useful. Such chemical sensitization includes three major classes, namely, gold or noble metal sensitization, sulfur sensitization, such as by a labile sulfur compound and reduction sensitization, e.g., treatment of the silver halide with a strong reducing agent which introduces small specks of metallic silver into the silver salt crystal or grain.

The preferred merocyanine dye salts of this invention are highly useful electron acceptors in high speed direct positive emulsions comprising fogged silver halide grains and a compound which accepts electrons, as described and claimed in Illingsworth U.S. patent application Ser. No. 609,794, now abandoned, filed Jan. 17, 1967 and titled "Photographic Reversal Materials III." The fogged silver halide grains of such emulsions are such that a test portion thereof, when coated as a photographic silver halide emulsion on a support to give a maximum density or at least about one upon processing for six minutes at about 68° F. in Kodak DK-50 developer, has a maximum density which is at least about 30% greater than the maximum density of an identical coated test portion which is processed for six minutes at about 68° F. in Kodak DK-50 developer after being bleached for about 10 minutes at about 68° F. in a bleach composition of:

Potassium cyanide _____ mg__ 50
Acetic acid (glacial) _____ cc__ 3.47
Sodium acetate _____ g__ 11.49
Potassium bromide _____ mg__ 119
Water to 1 liter.

The grains of such emulsions will lose at least about 25% and generally at least about 40% of their fog when bleached for ten minutes at 68° F. in a potassium cyanide bleach composition is described herein. This fog loss can be illustrated by coating the silver halide grains as a photographic silver halide emulsion on a support to give a maximum density of at least 1.0 upon processing for six minutes at about 68° F. in Kodak DK-50 developer and comparing the density of such a coating with an identical coating which is processed for six minutes at 68° F. in Kodak DK-50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than one micron, preferably less than about 0.5 micron, give particularly good results. The silver halide grains can be regular and can be any suitable shape such as cubic or octahedral, as described and claimed in Illingsworth U.S. patent application Ser. No. 609,778, now abandoned, filed Jan. 17, 1967, and titled "Direct Positive Photographic Emulsions I." Such grains advantageously have a rather uniform diameter frequency distribution, as described and claimed in Illingsworth U.S. patent application Ser. No. 609,790, now abandoned, filed Jan. 17, 1967, and titled "Photographic Reversal Emulsions II." For example, at least 95%, by weight of the photographic silver halide grains can have a diameter which is within about 40%, preferably within about 30% of the mean grain diameter. Means grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pages 330–338. The fogged silver halide grains in these direct-positive photographic emulsions of this invention produce a density of at least 0.5 when developed without exposure for five minutes at 68° F. in Kodak DK-50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

In the preparation of the above photographic emulsions, the preferred merocyanine dye salts, reducing agents and metal compounds of the invention are advantageously incorporated in the washed, finished silver halide emulsion and should, of course, be uniformly distributed throughout the emulsion. The methods of incorporating dye and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinylpyrrolidone, cellulose ethers, partially hydrolyzed cellulose acetate, and the like.

The preferred merocyanine dye salts, reducing agents and metal compounds of the invention can be used with emulsions prepared with any of the light-sensitive silver halide salts including silver chloride, silver bromide, silver chlorobromide, silver bromoiodide, silver chlorobromoiodide, etc. Particularly useful for direct positive fogged emulsions in which the silver salt is a silver bromohalide comprising more than 50 mole percent bromide. As indicated previously, the dyes of this invention are also useful in emulsions which contain color formers. This is unexpected since related prior art dyes cannot be used in emulsions containing a color former.

The novel emulsions of this invention may be coated on any suitable photographic support, such as glass, film base such as cellulose acetate, cellulose acetate butyrate, polyesters such as polyethylene terephthalate, paper, baryta coated paper, polyolefin coated paper, e.g., polyethylene or polypropylene coated paper, which may be electron bombarded to promote emulsion adhesion to produce the novel photographic elements of the invention.

The invention is further illustrated by the following examples. The dyes of Examples 1–7 are especially useful filter dyes.

EXAMPLE 1

Bis[3-(4-fluorosulfonylanilino)-1-(2,4,6-trichlorophenyl)-4-(2-pyrazolin-5-one)]trimethine oxonol

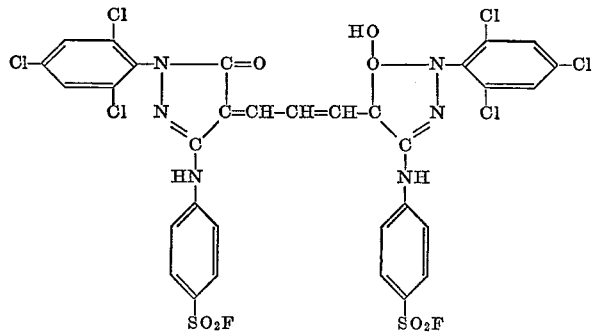

A mixture of 3.15 g. (2 mols.) of 3-(4-fluorosulfonylanilino)-1-(2,4,6-trichlorophenyl)-2-pyrazolin-5-one, 1.0 g. (1 mol. + 100% excess) of trimethoxypropene and 0.75 g. (1 mol. + 100% excess) of triethylamine was heated in 25 ml. of ethanol at the refluxing temperature for 10 minutes. The reaction mixture was poured into water and the whole made acidic with conc. HCl. The resulting precipitate was collected and purified by dissolving it in methanol containing triethylamine. The solution was filtered and the dye was precipitated by the addition of water and enough conc. HCl to make the solution acidic. The yield of dark red crystals was 59% and they had a melting point of 222–227° C. with decomposition.

EXAMPLE 2

Bis[3-(3-nitroanilino)-1-(2,4,6-trichlorophenyl)-4-(2-pyrazolin-5-one)]pentamethine oxonol A mixture of 1.8 g. (1 mol.) of 3-(cyanoanilino)-1-(2,4,6-trichlorophenyl)-2-pyrazolin-5-one, 2.3 g. (1 mol.) of 2-(2-acetanilidovinyl)-3-ethylbenzothiazolium iodide and 0.6 g. (1 mol. + 10% excess) of triethylamine was heated in 25 ml. of ethanol at the refluxing temperature for 10 minutes. The reaction mixture was chilled and the solid collected. The crude dye was purified by dissolving the crystals in hot pyridine, filtering the hot solution, adding methanol to the solution, chilling the mixture and collecting the dye. After another like treatment, the yield of dark red crystals was 68% and they had a melting point of 262–263° C. with decomposition.

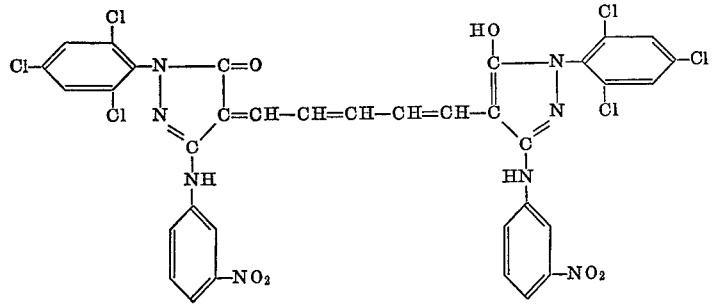

A mixture of 4.0 g. (2 mols.) of 3-(3-nitroanilino)-1-(2,4,6-trichlorophenyl)-3-pyrazolin-5-one, 1.5 g. (1 mol.) of glutaconic aldehyde dianil hydrochloride and 1.2 g. (2 mol. +10% excess) of triethylamine was heated in 25 ml. of ethanol at the refluxing temperature for 10 minutes. The reaction mixture was cooled, and enough conc. HCl was added to make the solution acidic. The precipitate was collected on a filter and it was washed with methanol. The solid was dissolved in methanol containing approximately 5 ml. of triethylamine, the solution was filtered and conc. HCl was added to the filtrate until it was acidic. The resulting solid was collected and the above treatment was repeated. The yield of dark crystals was 31% and they had a melting range of 209–216° C., with decomposition.

In place of the trimethoxypropene in above Example 1, and in place of the glutaconic aldehyde dianilhydrochloride in above Example 2, there can be substituted an equivalent amount of diethoxymethyl acetate to give the corresponding dye compounds bis[3-(4-fluorosulfonylanilino)-1-(2,4,6-trichlorophenyl)-4-(2-pyrazolin-5-one)] methine oxonol and bis[3-(3-nitroanilino)-1-(2,4,6-trichlorophenyl)-4-(2-pyrazolin-5-one)]methine oxonol, respectively. The oxonol dyes of the above described examples were found to be excellent filter dyes in photographic filter layers.

EXAMPLE 3

3-(4-chloroanilino)-4-[(3-ethyl-2-benzothiazolinylidene)ethylidene]-1-(2,4,6-trichlorophenyl) - 2 - pyrazolin-5-one

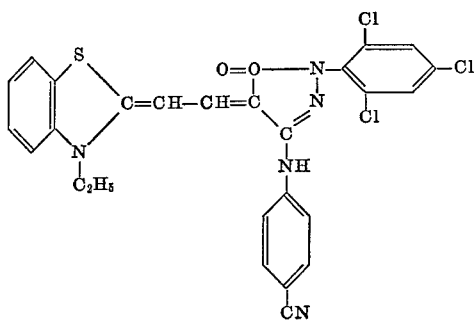

EXAMPLE 4

3-(4-chloroanilino)-4-[(3-ethyl-2-benzothiazolinylidene)ethylidene]-1-(2-nitrophenyl)-2-pyrazolin-5-one

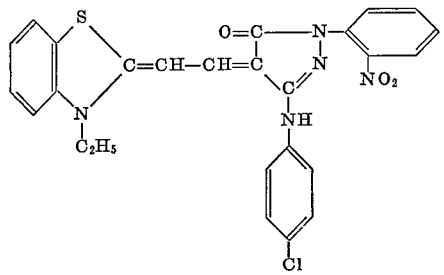

In a manner similar to Example 3, Example 4 was prepared from 1.6 g. (1 mol.) of 3-(4-chloroanilino)-1-(2-nitrophenyl)-2-pyrazolin-5-one and 2.3 g. (1 mol.) of 2-(2-acetanilidovinyl)-3-ethylbenzothiazolium iodide. The yield of shiny brown needles was 81% and they had a melting point of 174–175° C., with decomposition.

In place of the 2 - (2 - acetanilidovinyl) - 3 - ethylbenzothiazolium iodide in the above Examples 3 and 4, there can be substituted an equivalent amount of other related intermediate compounds defined by Formula IV above, such as 3-alkyl (e.g., methyl, ethyl, propyl, isopropyl, butyl, hexyl, decyl, dodecyl, etc.)-2-(2-acetanilidovinyl)benzothiazolium quaternary salt, e.g., the chloride, bromide, iodide, perchlorate, etc. salts, or a 3-alkyl (e.g., methyl, ethyl, propyl, isopropyl, butyl, hexyl, decyl, dodecyl, etc.) - (2 - acetanilidovinyl) benzoselenazolium quaternary salt, e.g., the chloride, bromide, iodide, perchlorate, p-toluenesulfonate, etc. salts, and the like, to give the corresponding merocyanine dyes having generally similar properties as photographic filter dyes, for example, the dye 3 - (4 - cyanoanilino-4-[(3-methyl-2-benzothiazolinylidene)ethylidene] - 1 - (2,4,6 - trichlorophenyl) - 2 - pyrazolin-5-one, the dye 3-(4-chloroanilino)-4 - [(3 - ethyl - 2 - benzoselenazolinylidene)ethylidene]-1 - (2 - nitrophenyl) - 2 - pyrazolin - 5 - one, etc. Also, in place of the 2 - pyrazolin - 5 - one intermediates in the above example, there can be substituted equivalent amounts of any other of the compounds defined by Formula V above to give the corresponding merocyanine photographic filter dyes.

EXAMPLE 5

3 - (4 - cyanoanilino) - 4 - [(1,3-diethyl-2(1H)-imidazo-[4,5 - b]quinoxalinylidene)ethylidene] - 1-(2,4,6-trichlorophenyl)-2-pyrazolin-5-one

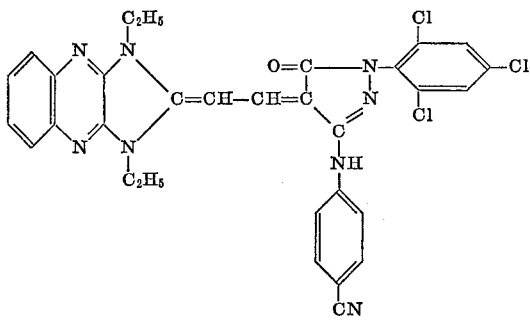

A mixture of 2.4 g. (1 mol.) of 4-anilinomethylene-3 - (4 - cyanoanilino) - 1 - (2,4,6 - trichlorophenyl)-2-pyrazolin - 5 - one, 1.8 g. (1 mol.) of 1,3-diethyl-2-methylimidazo[4,5-b]quinoxalinium iodide and 0.6 g. (1 mol.+10% excess) of triethylamine was heated in 25 ml. of acetic anhydride at the refluxing temperature for 5 minutes. The reaction mixture was concentrated to dryness using a rotary evaporator and the residue was stirred in methanol until crystalline. The crude dye was purified by dissolving it in hot pyridine, filtering the hot solution, adding methanol to the solution, chilling the mixture and collecting the solid. After another like treatment, the yield of dark red crystals with a green reflex was 23% and they had a melting point of 298–299° C., with decomposition.

EXAMPLE 6

3 - acetamido - 4 - [(1,3 - diethyl - 2(1H)-imidazo-[4,5 - b]quinoxalinylidene)ethylidene] - 1 - phenyl-2-pyrazolin-5-one

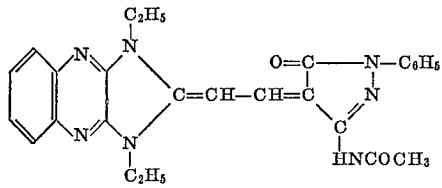

In a manner similar to Example 5, Example 6 was prepared from 1.6 g. (1 mol.) of 3 - acetamido - 4 - anilinomethylene - 1 - phenyl - 2 - pyrazolin - 5 - one and 2.1 g. (1 mol.) of 1,3 - diethyl - 2 - methylimidazo[4,5-b]quinoxalinium p-toluenesulfonate. The yield of deep red crystals with a shiny reflex was 39% and they had a melting point of 263–264° C., with decomposition.

EXAMPLE 7

3 - anilino - 4-[(1,3 - diethyl - 2-(1H)-imidazo[4,5-b]quinoxalinylidene)ethylidene]-1 - phenyl - 2-pyrazolin-5-one

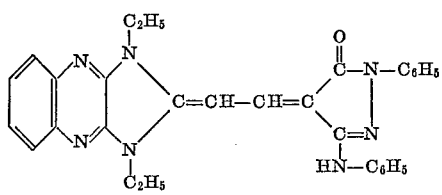

In a manner similar to Example 5, Example 7 was prepared from 3.5 g. (1 mol.) of 3-anilino-4-anilinomethylene - 1 - phenyl - 2 - pyrazolin-5-one and 2.7 g. (1 mol.) of 1,3 - diethyl - 2 - methylimidazo[4,5-b]quinoxalinium chloride. The yield of dark red crystals with a blue reflex was 36% and they had a melting point of 212–214° C., with decomposition.

In place of the 1,3 - diethyl - 2 - methylimidazo[4,5-b]quinoxalinium salts in the above Examples 5, 6 and 7, there can be substituted an equivalent amount of other related intermediate compounds defined by Formula IV above such as the 1,3-dialkyl, diaryl or dialkenyl (e.g., methyl, ethyl, propyl, isopropyl, butyl, hexyl, decyl, dodecyl, phenyl, allyl, 2-propenyl, etc.) - 2 - methylimidazo-[4,5-b]quinoxalinium salts, or the chloro-, dichloro-, nitro-, etc. derivatives substituted in the 6- and 7-positions thereof, and the like, to give the corresponding merocyanine dyes having generally similar properties as photographic filter dyes, for example, the dye 3 - (4-cyanoanilino) - 4 - [(1,3 - diallyl - 2(1H)-imidazo[4,5-b]quinoxalinylidene)ethylidene] - 1 - (2,4,6 - trichlorophenyl) - 2 - pyrazolin - 5 - one, the dye 3-acetamido-4-[(6 - chloro - 1,3 - diphenyl - 2(1H)-imidazo[4,5-b]quinoxalinylidene)ethylidene] - 1 - phenyl - 2 - pyrazolin-5-one, the dye 3 - anilino - 4 - [(1,3 - diethyl - 6 - nitro-2(1H) - imidazo[4,5-b]quinoxalinylidene) ethylidene]-1-phenyl-2-pyrazoline-5-one, etc. Also, in place of the 2-pyrazolin-5-one intermediates in the above examples, there can be substituted equivalent amount of any other of the compounds defined by Formula V above to give the corresponding merocyanine photographic filter dyes.

EXAMPLE 8

2 - [2 - (3 - anilino - 2 - methyl - 5 - oxo-1-phenyl-3-pyrazolin - 4 - yl)vinyl] - 1,3 - diethylimidazo[4,5-b]quinoxalinium iodide

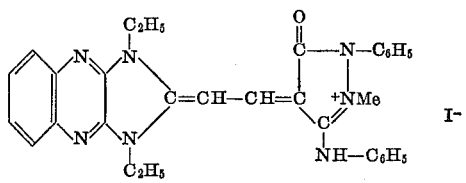

A mixture of 1.4 g. (1 mol.) of 3-anilino-4-[(1,3-diethyl - 2(1H) - imidazo[4,5-b]quinoxalinylidene)ethylidene] - 1 - phenyl - 2 - pyrazolin - 5 - one (dye of Example 7) and approximately 1 ml. of freshly distilled dimethylsulfate was heated to 150° C., then cooled and the viscous liquid was stirred in several portions of ether. The residue was dissolved in acetone and the solution was poured into aqueous potassium iodide. The resulting precipitate was collected and dried. The crude dye was recrystallized from 10 ml. of ethanol. The solid was again dissolved in 10 ml. of hot ethanol, and after chilling, the solution was filtered, approximately 100 ml. of ether was added to the filtrate, and the precipitate was collected on a filter. The yield of orange-red crystals was 18% and they had a melting point of 166–172° C., with decomposition.

The above prepared dye containing the desensitizing 1,3 - diethylimidazo[4,5-b]quinoxaline nucleus is photographically tested for its usefulness as an electron acceptor and spectral sensitizer for fogged direct positive photographic silver halide emulsions by the following procedure.

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner. The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The dye of the above example, 2-[2-(3- anilino-2-methyl-5-oxo - 1 - phenyl - 3 - pyrazolin-4-yl) vinyl]-1,3-diethylimidazo[4,5-b]quinoxalinium iodide, is then added to the above fogged emulsion in amount sufficient to give a concentration of 0.08 gram of the dye per mole of silver. The resulting emulsion is coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D-19 developer which has the following composition:

|  | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | then fixed, washed and dried. The results are listed in Table I hereinafter. Referring thereto, it will be seen that the dye of this example has a maximum density in the unexposed areas of 1.78 and a minimum density in exposed areas of 0.05, a maximum sensitivity of 510 nm. and a relative speed of 263. This result indicates that the dye compound of the above example is well suited to function as both an electron acceptor and spectral sensitizer. It thus provides excellent quality direct positive photographic silver halide emulsions. Excellent magenta images are obtained when the color former 1-(2,4,6-trichlorophenyl)-3-{3-[(2,4 - di - tert - pentylphenoxy)acetamido]benzamido}-2-pyrazolin-5-one is incorporated in the emulsion of this example, the emulsion is coated on a support, exposed to a tungsten source through Wratten filter No. 61 and No. 16, and reversal processed as described in Graham et al. U.S. Pat. 3,046,129, issued July 24, 1962, in Example (a) Col. 27, lines 27 et seq. except that black-and-white (MQ) development is omitted, the color development is reduced to one minute and is conducted in total darkness until after fixing.

EXAMPLE 9

2 - [2-(3-acetamido-2-methyl-5-oxo-1-phenyl-3-pyrazolin-4-yl)vinyl] - 1,3 - diethylimidazo[4,5-b]quinoxalinium methylsulfate

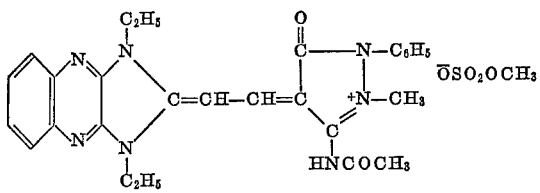

A mixture of 0.7 (1 mol.) of 3-acetamido-4-[(1,3-diethyl - 2 - (1H)imidazo[4,5-b]quinoxalinylidene)ethylidene]-1-phenyl-2-pyrazolin-5-one (dye of Example 6) and approximately 1 ml. of freshly distilled dimethylsulfate was heated to 150° C., the reaction mixture was then cooled and the viscous liquid was stirred in acetone, the suspension was filtered and the filtrate was chilled and the solid collected. After two recrystallizations from ethanol (50 ml./g.), the yield of brownish crystals was 10% and they had a melting point of 247–248° C., with decomposition.

The above dye containing the desensitizing 1,3-diethylimidazo[4,5-b]quinoxaline nucleus was photographically tested by the exact procedure described in above Example 8. The results as shown in Table 1 hereinafter indicate that this dye is an excellent electron acceptor for fogged direct positive photographic emulsions showing densities of 1.86 and 0.10 for the unexposed and exposed areas, respectively. However, the relative speed of 138 is somewhat lower than that of the other dyes listed in the table.

EXAMPLE 10

2-{2-[3-(4-cyanoanilino)-2-methyl - 5 - oxo-1-(2,4,6-trichlorophenyl)-3-pyrazolin - 4 - yl]vinyl} - 1,3 - diethylimidazo[4,5-b]quinoxalinium iodide

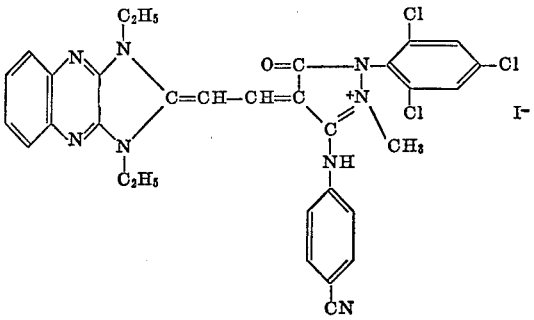

A mixture of 1.5 g. (1 mol.) of 3-(4-cyanoanilino)-4-[(1,3-diethyl - 2(1H) - imidazo[4,5-b]quinoxalinylidene)ethylidene]-1-(2,4,6-trichlorophenyl) - 2 - pyrazolin-5-one (dye of Example 5) and approximately 2 ml. of freshly distilled dimethylsulfate was heated to 150°. The reaction mixture was cooled, the viscous liquid was stirred in ether, the ether was decanted and the residue was dissolved in acetone. The acetone solution was poured into aqueous potassium iodide and the precipitate was collected on a filter. After two recrystallizations from ethanol (50 ml./g.), the yield of red crystals was 6% and they had a melting point of 196–197° C., with decomposition.

The above dye containing the desensitizing 1,3-diethylimidazo[4,5-b]quinoxaline nucleus was tested by the exact procedure in above Example 8. The results in Table 1 hereinafter show densities of 1.69 and 0.09 in the unexposed and exposed areas, respectively, and a moderately good speed of 191, thereby indicating that the dye of this example is an excellent electron acceptor for fogged direct positive photographic emulsions.

EXAMPLE 11

2-{2-[3-(4-cyanoanilino)-2-methyl-5-oxo - 1 - (2,4,6 - trichlorophenyl)-3-pyrazolin-4-yl]vinyl} - 3 - ethylbenzothiazolium p-toluenesulfonate

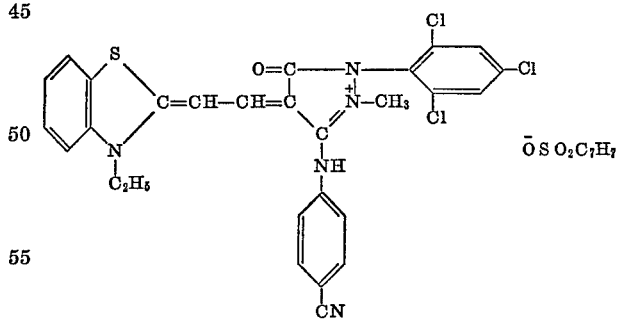

A mixture of 1.0 g. (1 mol.) of 3-(4-cyanoanilino)-4-[(3-ethyl - 2 - benzothiazolinylidene)ethylidene]-1-(2,4, 6-trichlorophenyl)-2-pyrazolin-5-one (dye of Example 3) and approximately 1 ml. of methyl p-toluenesulfonate was heated to 155° C. The reaction mixture was cooled, the viscous liquid was stirred in ether, the ether was decanted, the residue was stirred in acetone until crystalline and the solid was collected on a filter. The yield of orange crystals, after two recrystallizations from methanol (30 ml./ g.), was 60% and they had a melting point of 278–281° C., with decomposition.

The photographic testing of the above prepared dye containing the sensitizing 3-ethyl-2-benzothiazole nucleus was carried out by the exact procedure described in above Example 8. The results as shown in Table 1 hereinafter of densities of 1.72 and 0.03 in the unexposed and exposed areas, respectively with maximum sensitivity at

EXAMPLE 12

2-{2-[3-(4-chloroanilino) - 2 - methyl-1-(2-nitrophenyl)-5-oxo-3-pyrazolin - 4 - yl]vinyl}-3-ethylbenzothiazolium p-toluenesulfonate

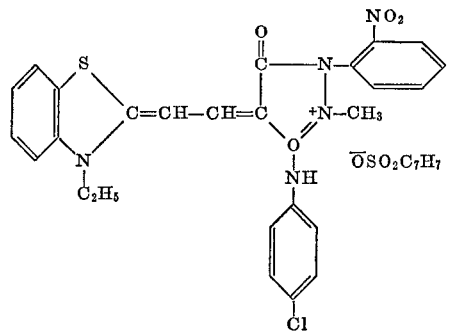

A mixture of 1.0 g. (1 mol.) of 3-(4-chloroanilino)-4-[(3-ethyl - 2 - benzothiazolinylidene)ethylidene]-1-(2-nitrophenyl)-2-pyrazolin-5-one (dye of Example 4) and approximately 1 ml. of methyl p-toluenesulfonate was treated as in Example 4. The yield of orange crystals was 65% and they had a melting point of 177–178° C.

The above prepared dye containing the sensitizing 3-ethyl-2-benzothiazole nucleus was photographically tested by the exact procedure described in above Example 8. The results as shown in Table 1 hereinafter of densities of 1.72 and 0.04 in the unexposed and exposed areas, respectively, with maximum sensitivity at 510 nm. and a relative speed of 398, indicate that the above dye is also an outstanding electron acceptor and spectral sensitizer for fogged direct positive photographic emulsions.

It will be apparent from the foregoing that the intermediates employed in above Examples 8 to 12, inclusive, can be substituted by any other of those defined by Formula II above to give still other related merocyanine dye salts having generally similar properties as electron acceptors and spectral sensitizers for fogged photographic reversal emulsions, for example, the dye 2-[2-(3-anilino-2-methyl - 5 - oxo - 1 - phenyl-3-pyrazolin-4-yl)vinyl]-6-chloro-1,3-diethylimidazo[4,5-b]quinoxalinium salt (quaternary salt, for example, the chloride, bromide, iodide, perchlorate, p-toluenesulfonate, etc., salt; the dye 1,3-diallyl-2-[2-(3 - anilino - 2 - methyl-5-oxo-1-phenyl-3-pyrazolin - 4 - yl)vinyl]imidazo[4,5-b]quinoxalinium salt; the dye 2-[2-(3-acetamido - 2 - methyl - 5 - oxo-1-phenyl-3-pyrazolin-4-yl)vinyl]-1,3-diethyl - 6 - nitroimidazo[4,5-b]quinoxalinium salt; the dye 1,3-dibutyl-2-[2-(2-methyl-5-oxo-1-phenyl-3-propionamido-3-pyrazolin - 4 - yl)vinyl]-imidazo[4,5-b]quinoxalinium salt; the dye 5,6-dichloro-2-{2-[3-(4-cyanoanilino)-2-methyl - 5 - oxo - 1 - (2,4,6-trichlorophenyl)-3-pyrazolin - 4 - yl]vinyl}-1,3-diethylimidazo[4,5-b]quinoxalinium salt, and the like; the dye 2-{2-[3-(4-cyanoanilino)-2-methyl - 5 - oxo-1-(2,4,6-trichlorophenyl)-3-pyrazolin-4-yl]vinyl}-3-ethyl - 6 - nitrobenzothiazolium salt; the dye 3-ethyl-2-{2-[3-(4-fluorosulfonylanilino) - 2 - methyl - 5 - oxo-1-(2,4,6-trichlorophenyl)-3-pyrazolin-4-yl]vinyl}-5-nitrobenzoxazolium salt; the dye 2-{2-[3-(4-chloroanilino)-2-methyl - 1 - (2-nitrophenyl)-5-oxo - 3 - pyrazolin-4-yl]vinyl}-3-ethyl - 6 - nitrobenzoselenazolium salt, and the like.

The following Examples 13–15 illustrates the preparation of some of the intermediates employed in the preceding examples to prepare the dye compounds of the invention.

EXAMPLE 13

4-anilinomethylene-3-(4-cyanoanilino)-1-(2,4,6-trichlorophenyl)-2-pyrazolin-5-one

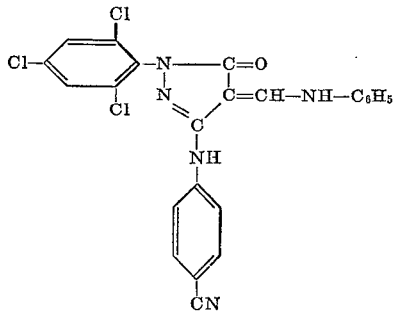

A mixture of 7.3 g. (1 mol.) of 3-(4-cyanoanilino)-1-(2,4,6-trichlorophenyl)-2-pyrazolin-5-one and 3.3 g. (1 mol.+10% excess) of ethyl isoformanilide was heated in 50 ml. of ethanol at the refluxing temperature for 1 hr. The reaction mixture was chilled, the resulting solid was collected on a filter and washed with ethanol. The yield of yellow crystals was 71%.

EXAMPLE 14

3-acetamido-4-anilinomethylene-1-phenyl-2-pyrazolin-5-one

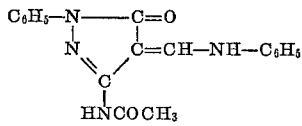

A mixture of 1.8 g. (1 mol.) of 3-acetamido-1-phenyl-2-pyrazolin-5-one and 1.4 g. (1 mol.+10% excess) of ethyl isoformanilide was heated in 10 ml. of ethanol for 1 minute. The reaction mixture was chilled, the resulting solid was collected on a filter and washed with ethanol. The yield of bright yellow crystals was 71%.

EXAMPLE 15

3-anilino-4-anilinomethylene-1-phenyl-2-pyrazolin-5-one

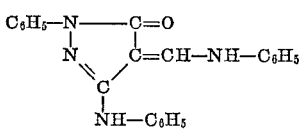

A mixture of 4.4 g. (1 mol.) of 3-anilino-1-phenyl-2-pyrazolin-5-one and 3.0 g. (1 mol.) of ethyl isoformanilide was heated in 25 ml. of ethanol at the refluxing temperature for 3 minutes. The reaction mixture was chilled, the resulting solid was collected on a filter and washed with ethanol. The yield of deep yellow crystals was 98%.

The effectiveness of the dyes of Examples 8 to 12 as electron acceptors and spectral sensitizers for fogged direct positive photographic materials was determined by the exact procedure described in above Example 8. The results are listed in the following table.

TABLE I

| | | Density | | | |
|---|---|---|---|---|---|
| | Dye conc., g./mole silver | Relative clear speed | Max. unexposed areas | Min. exposed areas | Sensitizing max. (nm.) |
| Dye of example number: | | | | | |
| 8 | 0.6 | 263 | 1.78 | .05 | 510 |
| 9 | 0.1 | 138 | 1.86 | .10 | |
| 10 | 0.6 | 191 | 1.69 | .09 | |
| 11 | 0.9 | 692 | 1.72 | .03 | 495 |
| 12 | 0.42 | 398 | 1.72 | .04 | 510 |
| Control | (1) | <1 | 1.90 | (2) | (2) |

[1] No dye.
[2] No reversal.

The following examples further illustrate the preparation of fogged, direct positive photographic emulsions and elements with the cyanine dyes of the invention.

EXAMPLE 16

To 9.0 pounds of a silver chloride gelatin emulsion containing an equivalent of 100 grams of silver nitrate is added 0.017 gram of 2-[2-(3-anilino - 2 - methyl-5-oxo-1-phenyl-3-pyrazolin-4-yl)vinyl]-1,3 - diethylimidazo[4,5-b]quinoxalinum iodide (Example 8). The emulsion is coated on a non-glossy paper support, and is flashed with white light to give a density of 1.2 when developed in the following developer, diluted 1 part to 2 parts of water:

| | Grams |
|---|---|
| N-methyl-p-aminophenol sulfate | 3.1 |
| Sodium sulfite, des. | 45 |
| Hydroquinone | 12 |
| Sodium carbonate, des. | 67.5 |
| Potassium bromide | 1.9 |

Water to 1 liter.

The light fogged material can be exposed to an image with light modulated by a Wratten No. 15 filter to give a direct positive image. Generally similar results are obtained when the dye of Example 10 is used in place of the above dye.

EXAMPLE 17

Seven pounds of a silver chloride gelatin emulsion containing the equivalent of 100 g. of silver nitrate is heated to 40° C. and the pH is adjusted to 7.8. Eight cc. of full strength (40%) formalin solution is added and the emulsion is held at 40° C. for 10 minutes. At the end of the holding period, the pH is adjusted to 6.0 and 0.125 g. of 2 - {2 - [3 - (4 - cyanoanilino) - 2 - methyl - 5 - oxo - 1-(2,4,6-trichlorophenyl) - 3 - pyrazolin - 4-yl]vinyl} - 3-ethylbenzothiazolium p-toluenesulfonate (Example 11). The emulsion is coated on a support, and provides good direct positive images. Similar results are obtained when the dye of Example 12 is substituted for the above dye.

By substituting other dye compounds of the invention, as defined in Formula I above, into the procedure of the above Examples 16 and 17, similar fogged, direct positive photographic silver halide emulsions and photographic elements may be prepared.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al. U.S. Pat. 2,322,027, issued June 15, 1943, Fierke et al., U.S. Pat. 2,801,171, issued July 30, 1957, Fisher U.S. Pats. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

I claim:

1. A dye selected from those having one of the following formulas:

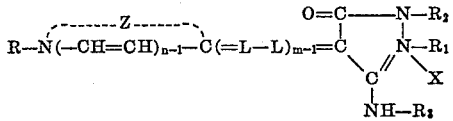

and

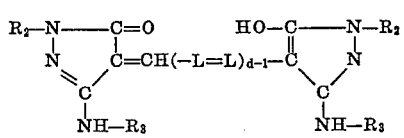

wherein $m$ and $n$ each represents a positive integer of from 1 to 2; $d$ represents a positive integer of from 1 to 3; L represents a methine linkage; R represents a member selected from the group consisting of an alkyl group of 1 to 4 carbon atoms, an alkenyl group of 1 to 4 carbon atoms and an aryl group of 6 to 20 carbon atoms; $R_1$ represents an alkyl group of 1 to 4 carbon atoms or an alkenyl group of 1 to 4 carbon atoms; $R_2$ represents an alkyl group of 1 to 4 carbon atoms or an aryl group of 6 to 20 carbon atoms; $R_3$ represents a member selected from the group consisting of an aryl group of 6 to 20 carbon atoms and the group —$COR_4$ wherein $R_4$ represents an alkyl group of 1 to 4 carbon atoms; X represents an acid anion selected from chloride, bromide, iodide, thiocyanate, sulfamate, perchlorate, p-toluenesulfonate, methyl sulfate and ethyl sulfate; and Z represents a nucleus selected from the group consisting of a thiazole nucleus, an oxazole nucleus, a selenazole nucleus, a thiazoline nucleus, a pyridine nucleus, a quinoline nucleus, and an imidazole nucleus.

2. A merocyanine dye represented by the following formula:

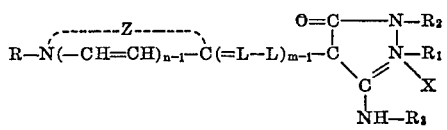

wherein $n$ and $m$ each represents a positive integer of from 1 to 2; L represents a methine linkage; R represents a member selected from the group consisting of an alkyl group of 1 to 4 carbon atoms, an alkenyl group of 1 to 4 carbon atoms and an aryl group of 6 to 20 carbon atoms; $R_1$ represents an alkyl group of 1 to 4 carbon atoms or an alkenyl group of 1 to 4 carbon atoms, $R_2$ represents an alkyl group of 1 to 4 carbon atoms or an aryl group of 6 to 20 carbon atoms; $R_3$ represents a member selected from the group consisting of an aryl group of 6 to 20 carbon atoms and the group —$COR_4$ wherein $R_4$ represents an alkyl group of 1 to 4 carbon atoms; X represents an acid anion selected from chloride, bromide, iodide, thiocyanate, sulfamate, perchlorate, p-toluenesulfonate, methyl sulfate and ethyl sulfate and Z represents a nucleus selected from the group consisting of a thiazole nucleus, an oxazole nucleus, a selenazole nucleus, a thiazoline nucleus, a pyridine nucleus, a quinoline nucleus, and an imidazole nucleus.

3. A dye as defined by claim 2 wherein said $m$ is 2.

4. A dye as defined by claim 2 wherein said Z in an imidazo[4,5-b]quinoxaline nucleus.

5. A dye as defined by claim 2 wherein said Z is a thiazole nucleus.

6. A dye selected from the group consisting of 2-[2-(3- anilino - 2 - methyl - 5 - oxo - 1 - phenyl - 3 - pyrazolin- 4 - yl) - vinyl] - 1,3 - diethylimidazo[4,5 - b]quinoxalinium salt; 2-[2-(3-acetamido-2-methyl-5-oxo-1-phenyl-3-pyrazolin - 4 - yl)vinyl] - 1,3 - diethylimidazo[4,5-b]quinoxalinium salt; 2 - {2 - [3 - (4-cyanoanilino)-2-methyl-5-oxo - 1 - (2,4,6 - trichlorophenyl) - 3 - pyrazolin - 4 - yl]-vinyl}-1,3-diethylimidazo[4,5-b]quinoxalinium salt; 2-{2-[3 - (4 - cyanoanilino) - 2 - methyl - 5 - oxo - 1 - (2,4,6-trichlorophenyl) - 3 - pyrazolin - 4 - yl]vinyl} - 3 - ethyl-benzothiazolium salt; and 2-{2-[3-(4-chloroanilino)-2-methyl - 1 - (2 - nitrophenyl) - 5 - oxo - 3 - pyrazolin - 4 - yl]vinyl}-3-ethylbenzothiazolium salt.

7. An oxonol dye having the formula:

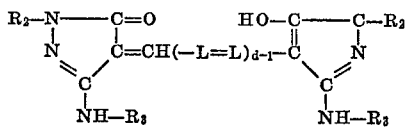

wherein $d$ represents a positive integer of from 1 to 3; L represents a methine linkage; $R_2$ represents an alkyl group of 1 to 4 carbon atoms or an aryl group of 6 to 20 carbon atoms; $R_3$ represents a member selected from the group consisting of an aryl group of 6 to 20 carbon atoms and the group $-COR_4$ wherein $R_4$ represents an alkyl group of 1 to 4 carbon atoms.

8. A dye selected from the group consisting of bis[3-(4-fluorosulfonylanilino) - 1 - (2,4,6 - trichlorophenyl) - 4-(2-pyrazolin-5-one)]trimethine oxonol; bis[3-(3-nitroanilino) - 1 - (2,4,6 - trichlorophenyl) - 4 - (2 - pyrazolin-5-one)]pentamethine oxonol.

References Cited
UNITED STATES PATENTS

| | | | |
|---|---|---|---|
| 2,639,282 | 5/1953 | Sprague et al. | 260—240.4 |
| 2,652,397 | 9/1953 | Aubert et al. | 260—240.4 |
| 2,656,352 | 10/1953 | Knott et al. | 260—240.1 |

JOHN D. RANDOLPH, Primary Examiner

U.S. Cl. X.R.

96—107, 139; 260—240.4, 240.8, 283 S, 294.8 G, 298, 304, 306, 306.7, 307 D, 309, 310 A, 326.12 R